United States Patent
Erhart et al.

(10) Patent No.: US 7,471,786 B2
(45) Date of Patent: Dec. 30, 2008

(54) INTERACTIVE VOICE RESPONSE SYSTEM WITH PARTIAL HUMAN MONITORING

(75) Inventors: George William Erhart, Pataskala, OH (US); Valentine C. Matula, Granville, OH (US); David Joseph Skiba, Golden, CO (US); Glen A. Taylor, Columbus, OH (US)

(73) Assignee: Avaya Inc., Basking Ridge, NJ (US)

( * ) Notice: Subject to any disclaimer, the term of this patent is extended or adjusted under 35 U.S.C. 154(b) by 536 days.

(21) Appl. No.: 11/107,673

(22) Filed: Apr. 15, 2005

(65) Prior Publication Data

US 2006/0233326 A1    Oct. 19, 2006

(51) Int. Cl.
*H04M 3/523* (2006.01)
(52) U.S. Cl. .............. 379/265.02; 379/88.16; 705/8; 709/228
(58) Field of Classification Search ............. 379/88.16, 379/88.18, 265.02; 705/8; 709/228
See application file for complete search history.

(56) References Cited

U.S. PATENT DOCUMENTS

| | | | |
|---|---|---|---|
| 6,047,060 A * | 4/2000 | Fedorov et al. ........ | 379/265.02 |
| 6,259,785 B1 * | 7/2001 | Shaffer et al. .......... | 379/265.02 |
| 6,487,277 B2 | 11/2002 | Beyda et al. | |
| 7,305,070 B2 * | 12/2007 | Kortum et al. ........... | 379/88.18 |
| 2003/0053615 A1 | 3/2003 | Anderson et al. | |
| 2003/0212558 A1 | 11/2003 | Matula | |

* cited by examiner

*Primary Examiner*—Gerald Gauthier
(74) *Attorney, Agent, or Firm*—DeMont & Breyer, LLC (57) ABSTRACT

The present invention enables service agents in a call center to monitor portions of calls that are especially error-prone (e.g., automated speech recognition of an address, etc.), while portions of calls that are not error-prone occur without any human monitoring. An interactive voice response (IVR) system script (e.g., a VXML script, etc.) is divided into a plurality of independent dialog sequences, each of which is assigned a human-monitoring requirement that indicates whether (and optionally, to what degree) the dialog sequence requires monitoring by a service agent. In the first illustrative embodiment, a partial ordering enables some dialog sequences to appear in a different order in that of the IVR script when it is advantageous to do so. In the second illustrative embodiment, each dialog sequence that requires human monitoring is recorded and packaged into an agent-review task that is subsequently sent to an available service agent for review.

14 Claims, 11 Drawing Sheets

```
<vxml version ="2.0" xml:lang="en-US" xmlns=http://www.w3.org/2001/vxml application="AppRoot.aspx">
<form id="f_info">
    <field name="ssn">
        <prompt>
            Welcome to ABC Bank Online Access. Please provide your social security number.
        </prompt>
        <grammar src="ssn.grxml" type="application/srgs+xml"/>
    </field>
    <field name="maidenName">
        <prompt>
            For security purposes, please provide your mother's maiden name.
        </prompt>
        <grammar src="name.grxml" type="application/srgs+xml"/>
    </field>
    <filled>
        <goto next="#f_menu"/>
    </filled>
</form>

<menu id = "f_menu">
<property name="inputmodes" value="dtmf voice"/>
<prompt bargein="true" timeout="5s">
    This is the main menu. For balances, press or say 1. For transactions, press or say 2.
</prompt>
<choice dtmf="1" next="RetrieveRecord.aspx">
    <grammar type="application/grammar+xml" root="Choice1" version="1.0">
        <rule id="Choice1" scope="public">
            <one-of> <item> 1 </item> </one-of>
        </rule>
    </grammar>
</choice>
<choice dtmf="2" next="Transaction.aspx">
    <grammar type="application/grammar+xml" root="Choice2" version="1.0">
        <rule id="Choice2" scope="public">
            <one-of> <item> 2 </item> </one-of>
        </rule>
    </grammar>
</choice>
</menu>
</vxml>
```

INTERACTIVE VOICE RESPONSE SYSTEM WITH PARTIAL HUMAN MONITORING

FIELD OF THE INVENTION

The present invention relates to telecommunications in general, and, more particularly, to an interactive voice response system that enables partial human monitoring of calls.

BACKGROUND OF THE INVENTION

A call center is a place where calls from users, such as customers, are handled in support of an organization's activities. Organizations that provide a call center, such as companies that offer a service or a product, do so to provide assistance and information to customers of the service or product. A call center typically comprises an interactive voice response (IVR) system that enables a caller to obtain information without any human involvement, or to speak to a person known as a service agent. Typically an interactive voice response (IVR) system presents a hierarchy of menus to a caller, and enables the caller to input information to navigate the menus (e.g., entering alphanumeric information via a telephone keypad, selecting a menu option by saying the number associated with the option, etc.). An interactive voice response (IVR) system is advantageous economically because it enables a call center to accommodate callers with fewer service agents.

Figure 1:
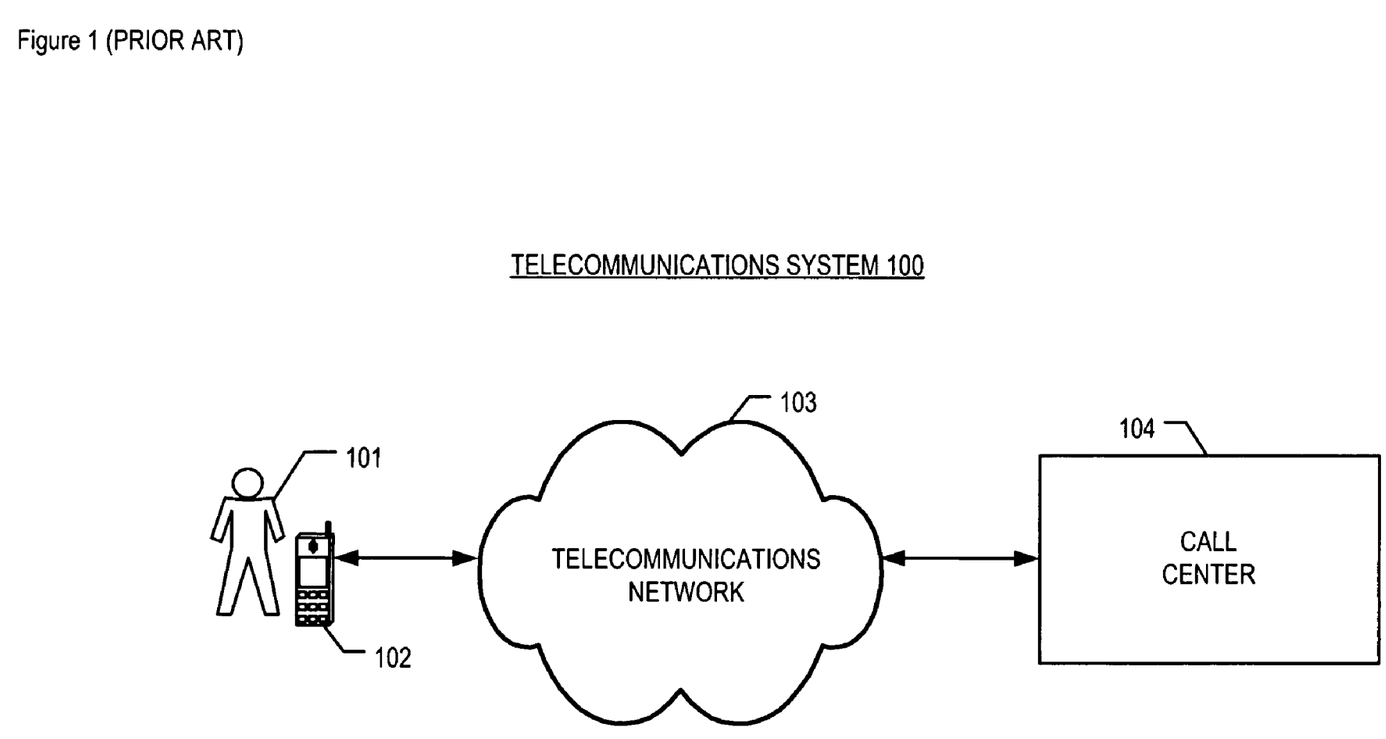
FIG. 1 depicts telecommunications system 100 in accordance with the prior art.

FIG. 1 depicts telecommunications system 100 in accordance with the prior art. Telecommunications system 100 comprises telecommunications terminal 102, telecommunications network 103, and call center 104, interconnected as shown.

User 101 uses telecommunications terminal 102 (e.g., a telephone, a browser-enabled client, etc.) to place a call to call center 104 via telecommunications network 103 (e.g., the Public Switched Telephone Network [PSTN], the Internet, etc.). Typically user 101 uses telecommunications terminal 102 to place a voice telephone call to call center 104. In some instances, however, user 101 might initiate a text-based instant messaging (IM) session, or might activate a "push-to-talk" button on a website that is associated with call center 104, etc.

Figure 2:
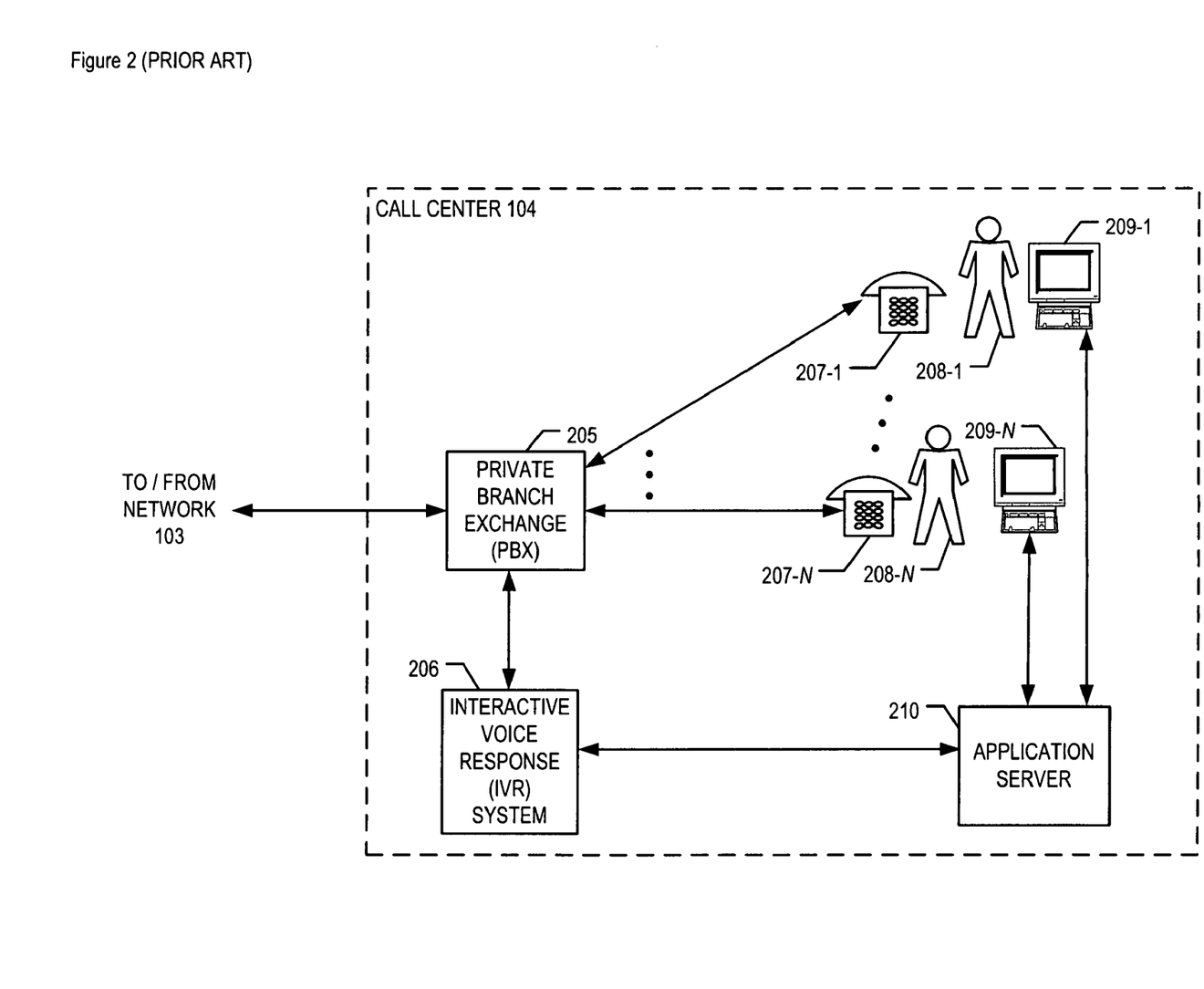
FIG. 2 depicts the salient elements of call center 104, as shown in FIG. 1, in accordance with the prior art.

FIG. 2 depicts the salient elements of call center 104, in accordance with the prior art. Call center 104 comprises data-processing system 205; interactive voice response system (IVR) 206; telecommunications terminals 207-1 through 207-N, where N is a positive integer; clients 209-1 through 209-N; and application server 210, interconnected as shown.

As shown in FIG. 2, each telecommunications terminal 207-*n* (e.g., a telephone, etc.), for n=1 through N, is associated with a respective service agent 208-*n*. Service agent converse with callers via telecommunications terminal 207, and interact with one or more software applications via client 209-*n* (e.g., a personal computer, a "dumb" terminal, etc.), both during a call and between calls. The software applications are client/server or web-based and are hosted on application server 210, in well-known fashion.

Private branch exchange (PBX) 205 receives incoming calls from telecommunications network 103 and directs the calls to interactive voice response (IVR) system 206 or to one of telecommunications terminals 207. Private branch exchange (PBX) 205 also receives outbound signals from telecommunications terminals 507 and interactive voice response system 506 and transmits the signals on to telecommunications network 103 for delivery to the caller's terminal.

Interactive voice response (IVR) system 206 prompts a caller for information and menu selections via synthesized speech, and receives input from the caller (e.g., speech signals, keypad input, etc.) via private branch exchange 205. Interactive voice response system 206 is also capable of: recording a caller's speech and keypad input during a call; performing automated speech recognition (ASR) on a caller's speech; submitting commands and forwarding caller input to one or more software applications that reside on application server 210; and receiving output from these software applications.

Application server 210 hosts one or more web-based or client/server software applications that perform tasks such as customer record maintenance, inventory management, order processing, etc. As described above, these software applications can be accessed by both clients 209 and interactive voice response (IVR) system 206.

The Extensible Markup Language, abbreviated XML, is a specification that enables the creation of customized tags, which in turn enables the definition, transmission, validation, and interpretation of data between two applications, organizations, etc. Voice Extensible Markup Language (abbreviated VoiceXML or VXML) is an application of the Extensible Markup Language (XML) that enables dialogs featuring synthesized speech, digitized audio, recognition of spoken and keyed input, recording of spoken input, and telephony. The primary objective of VXML is to bring the advantages of web-based development and content delivery to interactive voice response applications.

Figure 3:
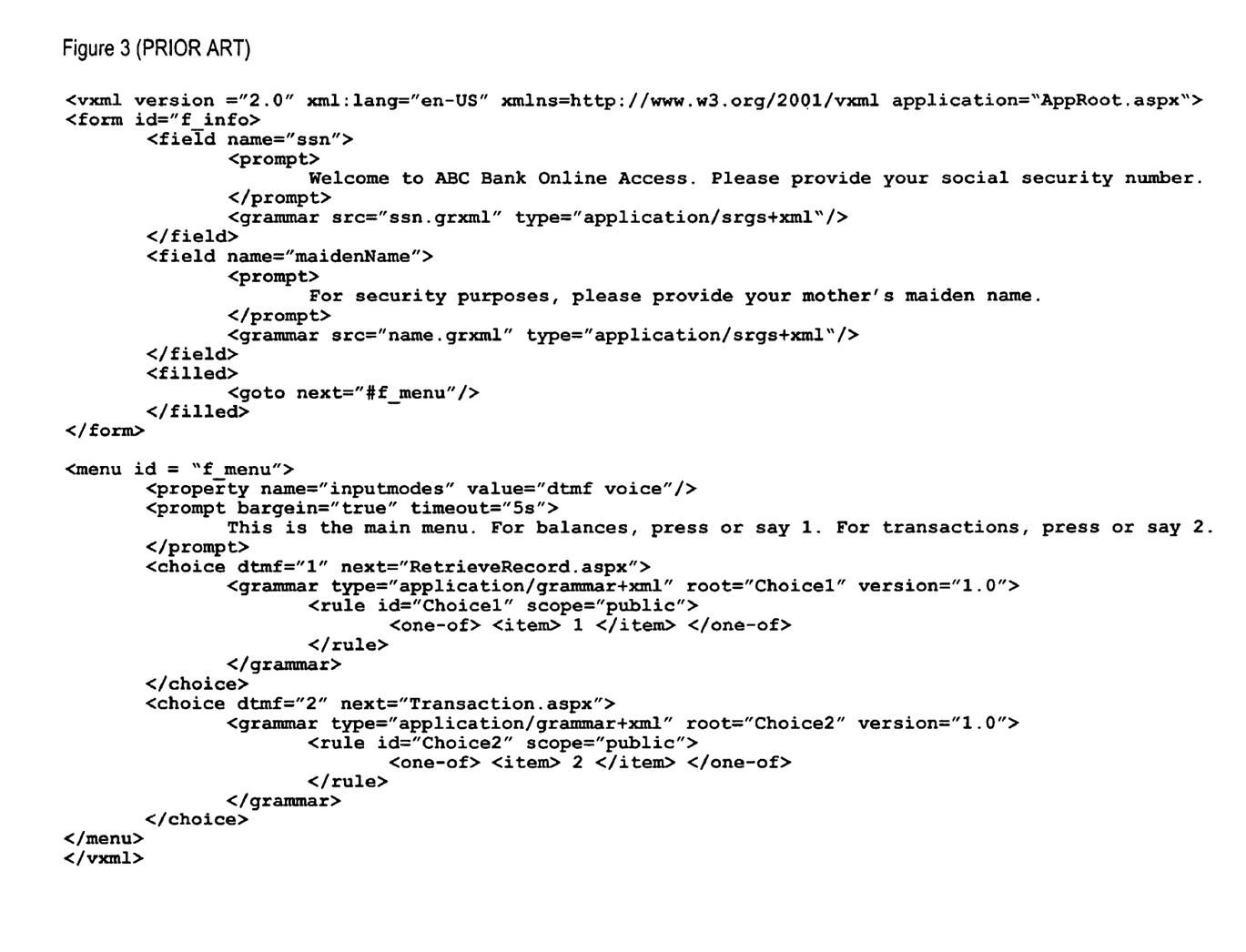
FIG. 3 depicts an exemplary Voice Extensible Markup Language (VXML) document, in accordance with the prior art.

FIG. 3 depicts an exemplary Voice Extensible Markup Language (VXML) script (also known as a VXML document or page), in accordance with the illustrative embodiment of the present invention. The VXML script, when executed by interactive voice response system 206, prompts the caller for his or her social security number, and then his or her mother's maiden name for security purposes. The script then presents a menu with two options; the first option is for reviewing account balances, and the second option is for performing transactions. Audio content (in particular, synthesized speech) that corresponds to text between the <prompt> and </prompt> tags is generated by interactive voice response system 206 and transmitted to the caller.

In call centers that employ VXML scripts, typically application server 210 initially retrieves a "top-level" script at the beginning of a call, and subsequently, in response to menu selections and information supplied by the caller, application server 210 might retrieve one or more additional VXML scripts during the course of a call (e.g., a script for reviewing account balances, a script for processing transactions, etc.). Alternatively, a single large VXML script or application might be employed for the entire duration of a call.

SUMMARY OF THE INVENTION

A problem with interactive voice response (IVR) systems is that automated speech recognition (ASR) is typically very accurate for some inputs such as zip code and social security number, but can be much less accurate for others such as name, street address, etc. It would be advantageous, therefore, if a service agent could monitor a call and validate information provided by the caller, correct erroneous information, and so forth. If service agents monitor each call, however, the economic advantage of using an interactive voice response (IVR) system is greatly diminished.

The present invention enables service agents to monitor particular portions of calls that are especially error-prone (e.g., automated speech recognition of an address, etc.), while portions of calls that are not error-prone occur without any human monitoring. In particular, an interactive voice response (IVR) system script (e.g., a VXML script, etc.) is divided into a plurality of independent dialog sequences, each of which is assigned a human-monitoring requirement that indicates whether (and optionally, to what degree) the dialog sequence requires monitoring by a service agent in order to achieve a desired level of performance.

In the first illustrative embodiment of the present invention, a partial ordering is defined that indicates which dialog sequences must occur before other dialog sequences. The partial ordering may enable a first dialog sequence that comes after a second dialog sequence in the script to in fact be executed before the second dialog sequence when it is advantageous to do so. For example, suppose a first dialogue sequence of an interactive voice response (IVR) script asks for the caller's name, and a second dialog sequence that occurs after the first dialogue sequence in the script asks for the caller's telephone number. If no service agent is available when the interactive voice response (IVR) system is ready to execute the first dialog sequence, it would be advantageous to first execute the second dialog sequence (which typically does not require human monitoring) because a service agent might subsequently become available to monitor the first dialog sequence (which does require human monitoring). Such a reordering of the dialog sequences would be indicated as permissible by the partial ordering. As will be clear to those skilled in the art, there are some pairs of dialog sequences that should not be reordered in this fashion, as would be indicated by the partial ordering. For example, the options for a second-level menu should not be presented until after the options for a first-level menu have been presented and the caller has input his or her selection for the first-level menu.

In the second illustrative embodiment of the present invention, each dialog sequences that requires human monitoring is recorded and packaged into an agent-review task, which is subsequently sent to an available service agent for review. The agent-review task also contains the automated speech recognition (ASR) for the dialog sequence, thus enabling the service agent to check for any errors and make any necessary corrections.

By enabling service agents to monitor or review only the error-prone portions of calls, both illustrative embodiments enable a call center to function with fewer service agents.

An illustrative embodiment comprises: selecting a dialog sequence from a non-empty set S of dialog sequences, wherein each of the dialog sequences has a human-monitoring requirement; and executing the dialog sequence during a call that involves an interactive voice response system; wherein the selection of the dialog sequence is based on: (i) the human-monitoring requirements, and (ii) the availability of one or more service agents.

DETAILED DESCRIPTION

The terms appearing below are given the following definitions for use in this Description and the appended Claims.

For the purposes of the specification and claims, the term "call" is defined as an interactive communication involving one or more telecommunications terminal users. A call might be a traditional voice telephone call, an instant messaging (IM) session, a video conference, etc.

Figure 4:
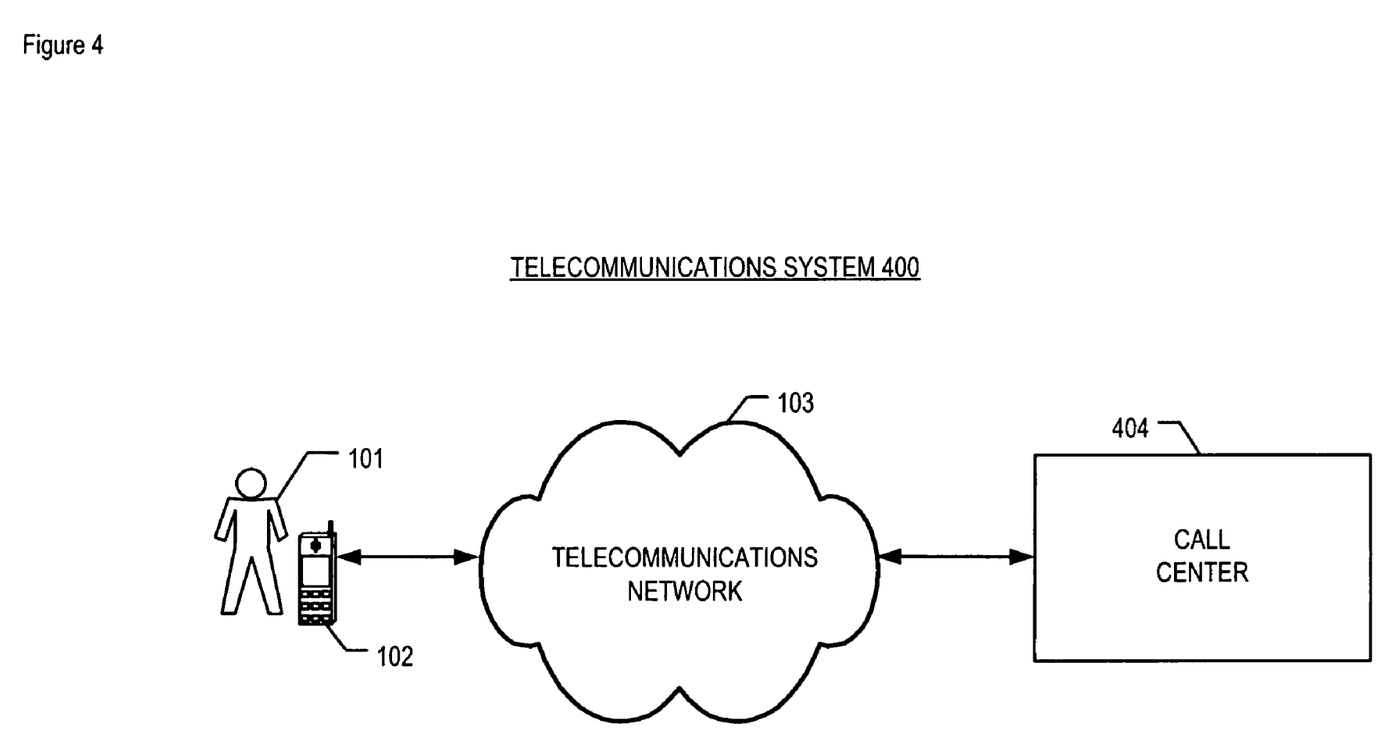
FIG. 4 depicts telecommunications system 400 in accordance with the illustrative embodiments of the present invention.

FIG. 4 depicts telecommunications system 400 in accordance with the illustrative embodiments of the present invention. Telecommunications system 400 comprises telecommunications terminal 102 and telecommunications network 103 of the prior art, and call center 404, interconnected as shown.

Figure 5:
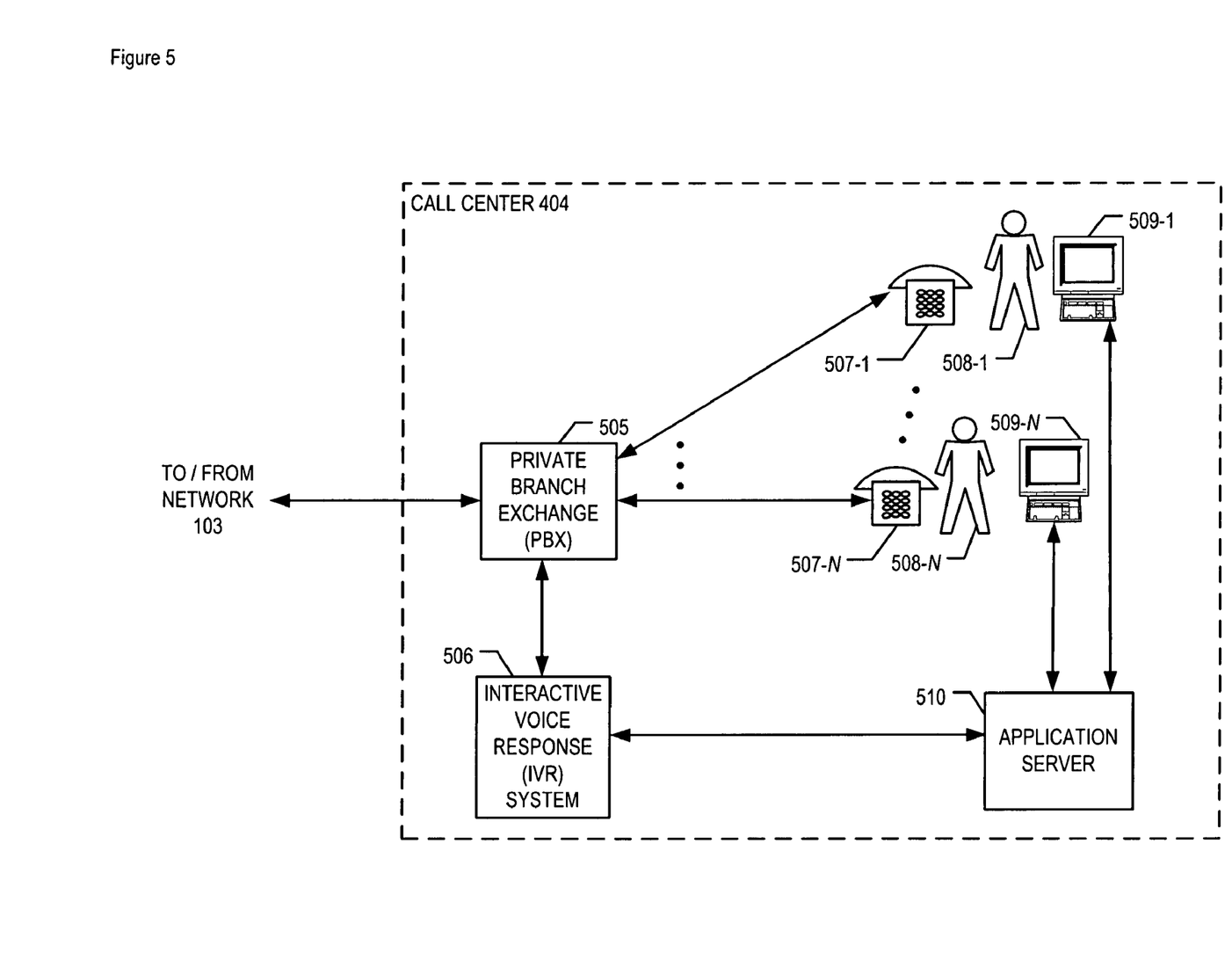
FIG. 5 depicts the salient elements of call center 404, as shown in FIG. 4, in accordance with the illustrative embodiments of the present invention.

FIG. 5 depicts the salient elements of call center 404, in accordance with the illustrative embodiments of the present invention. Call center 404 comprises private branch exchange (PBX) 505; interactive voice response system (IVR) 506; telecommunications terminals 507-1 through 507-N, where N is a positive integer; clients 509-1 through 509-N; and application server 510, interconnected as shown.

Application server 510 has the same capabilities as application server 210 of the prior art, and is also capable of performing additional tasks as described below and with respect to FIGS. 6 through 10. the functionality described with the Private branch exchange (PBX) 505 is similar to PBX 205 of the prior art and interacts with telecommunications network 103, interactive voice response system (IVR) 506, and telecommunications terminals 507-1 through 507-N as described above for PBX 205.

Private branch exchange (PBX) 505 has the same capabilities as PBX 205 of the prior art.

Telecommunications terminals 507-1 through 507-N are have the same capabilities as telecommunications terminals 207-1 through 207-N of the prior art.

Clients 508-1 through 508-N have the same capabilities as clients 208-1 through 208-N of the prior art.

Interactive voice response (IVR) system 506 has the same capabilities as IVR system 206 of the prior art, and is also capable of receiving commands from application server 510 to start and stop recording of a call while the call is in progress.

Figure 6:
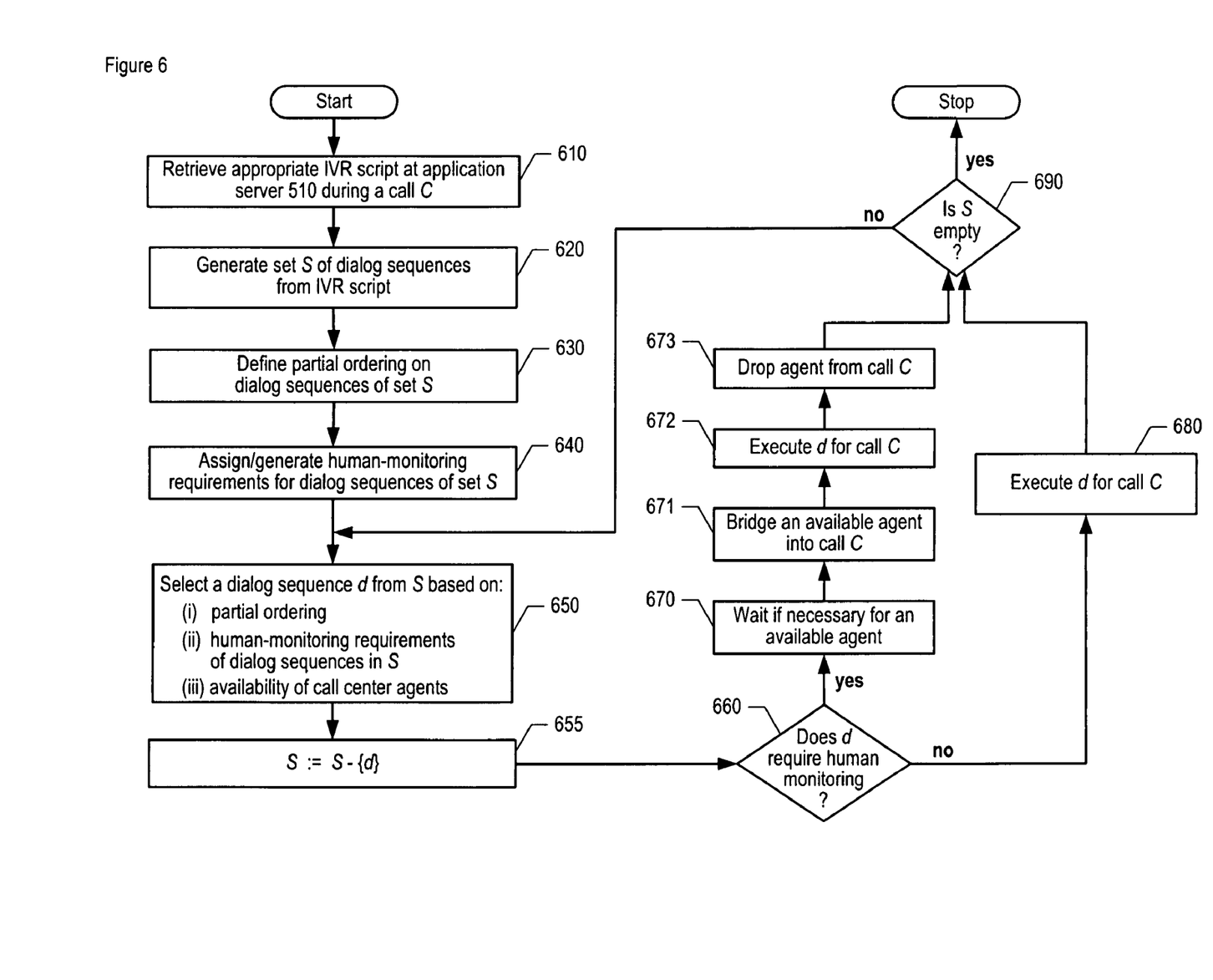
FIG. 6 depicts a flowchart of the salient tasks involved in processing an interactive voice response script, in accordance with the first illustrative embodiment of the present invention.

FIG. 6 depicts a flowchart of the salient tasks involved in processing an interactive voice response script, in accordance with the first illustrative embodiment of the present invention.

At task 610, application server 510 retrieves an appropriate IVR script (e.g., a VXML script, etc.) during a call C, in well-known fashion.

At task 620, application server 510 generates a set S of dialog sequences from the IVR script. A dialog sequence is a portion of a IVR script that is independent of any other portions of the IVR script. For example, in the IVR script of FIG. 3, the script might be divided into the following three dialog sequences: a first dialog sequence that comprises greeting the caller, asking for his or her social security number, and validating the social security number against a database; a second dialog sequence that comprises asking the caller for his or her mother's maiden name and validating the name against a database; and a third dialog sequence that comprises presenting the options of the menu and obtaining the caller's selection. It will be clear to those skilled in the art how to parse a IVR script and divide the script into a set of dialog sequences.

At task 630, application server 510 defines a partial ordering on the dialog sequences of set S. Intuitively, the partial ordering means that either: a first dialog sequence might temporally come before a second dialog sequence (i.e., the first dialog sequence is a predecessor of the second dialog sequence); the second dialog sequence is a predecessor of the first dialog sequence; or they are temporally unrelated (i.e., either the first can come before the second, or the second can come before the first). Formally, a partial ordering over set S is a relation R∈S×S such that:

(i) ∀x∈R:(x, x) ∉R, (ii) ∀x, y ∈S where x≠y, at most one of (x, y) and (y, x) ∈R, and (iii) (x, y) ∈R and (y, z) ∈R, → (x, z) ∈R.

As is well-known in the art, a variety of data structures such as a tree or directed acyclic graph can be used to represent a partial order on a set of elements. In the case of set S, each node in a tree or graph would represent one of the dialog sequences of S. It will be clear to those skilled in the art how to define a partial ordering on, and build a corresponding data structure for, the dialog sequences of a IVR script based on the contents and structure of the script.

At task 640, application server 510 assigns or generates human-monitoring requirements for the dialog sequences of set S. As will be appreciated by those skilled in the art, in some embodiments a human-monitoring requirement might be a simple Boolean value that indicates whether a dialog sequence requires any human monitoring, while in some other embodiments a human-monitoring requirement might be a numeric value that indicates the degree to which a dialog sequence requires human monitoring, or yet some other data type. As will further be appreciated by those skilled in the art, human-monitoring requirements can be assigned manually or generated automatically, and can be based on empirical data (e.g., the error rate of a particular dialog sequence or of a particular class of dialog sequences, etc.), or on heuristics that take into account the length of a dialog sequence, the kind of input requested from the caller in a dialog sequence, and so forth.

At task 650, application server 510 selects a dialog sequence d from set S based on:

(i) the partial ordering defined at task 630, (ii) the human-monitoring requirements of dialog sequences in S, and (iii) the availability of one or more service agents.

Task 650 is described in detail below and with respect to FIG. 7.

At task 655, the selected dialog sequence d is removed from set S.

At task 660 application server 510 checks whether dialog sequence d requires human monitoring. As will be appreciated by those skilled in the art, in some embodiments this might be accomplished by checking whether a Boolean value associated with dialog sequence d is true, while in some other embodiments this might be accomplished by checking whether a numeric value is non-zero. If dialog sequence d requires human monitoring, execution proceeds to task 670; otherwise execution continues at task 680.

At task 670, if no service agent is available, then execution of the method waits until a service agent is available. In some embodiments, interactive voice response (IVR) system 506 might output to the caller a "stall phrase" (e.g., "One moment please", etc.) or a "filler" dialogue sequence (e.g., "Are you still at address 123 Maple Lane?", "As a valued customer, can we take a moment to ask about some questions about your last on-line order experience?", etc.) in order to avoid the appearance of a dropped call or system crash.

At task 671, private branch exchange 505 bridges an available service agent into call C, in well-known fashion. In some embodiments of the present invention, the service agent's client 509 enables the service agent to validate information provided during the dialog sequence, correct the information, and so forth. Furthermore, in some embodiments, the service agent might receive a visual representation of the dialog sequence at respective client 509, either in addition to or in lieu of audio bridging (as disclosed, for example, in U.S. patent application Ser. No. 10/874,791, incorporated by reference).

At task 672, interactive voice response (IVR) system 506 executes dialog sequence d for call C, in well-known fashion.

At task 673, private branch exchange 505 drops the service agent from call C, in well-known fashion. As appropriate, service agent's client 509 also closes the visual representation and the interface for validating and correcting information. After task 673 is completed, execution continues at task 690.

As will be appreciated by those skilled in the art, in some variations of the first illustrative embodiment, instead of waiting for an available service agent, the dialog sequence is executed without monitoring by an agent, and a recording of the dialog sequence is subsequently sent to an available service agent for review, as described below and with respect to the second illustrative embodiment.

At task 680, interactive voice response (IVR) system 506 executes dialog sequence d for call C, in well-known fashion.

At task 690, application server 510 checks whether set S is empty. If so, the method of FIG. 6 terminates; otherwise execution continues back at task 650.

Figure 7:
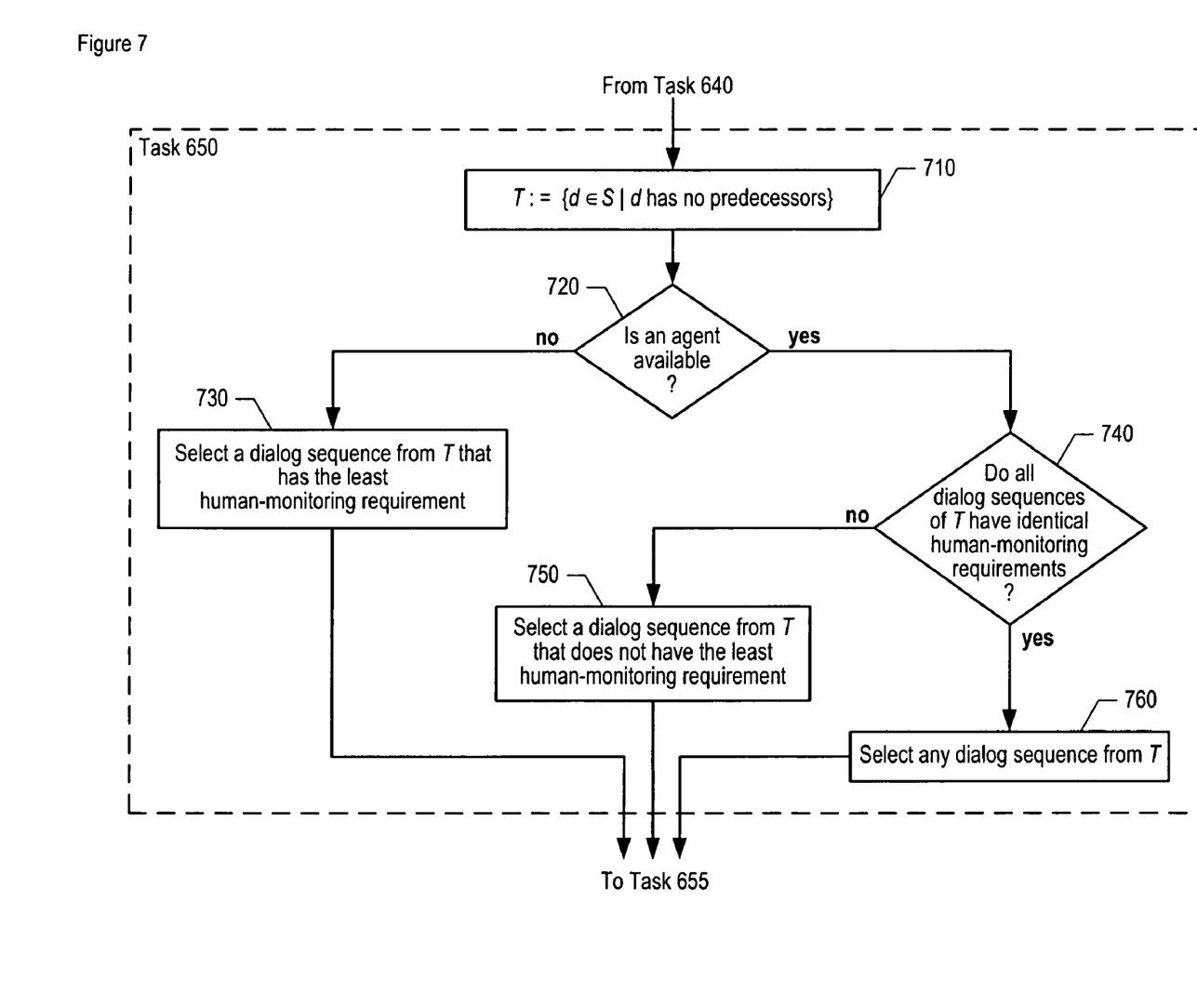
FIG. 7 depicts a detailed flowchart of task 650, as shown in FIG. 6, in accordance with the first illustrative embodiment of the present invention.

FIG. 7 depicts a detailed flowchart of task 650 in accordance with the first illustrative embodiment of the present invention.

At task 710, variable T is initialized to the set of dialog sequences in S that have no predecessor. In other words, set T contains the dialog sequences of S that do not require another dialog sequence of S to occur beforehand, and thus are candidates for execution by interactive voice response (IVR) system 506.

At task 720, application server 510 checks whether there is an available service agent. If not, execution proceeds to task 730; otherwise, execution continues at task 740.

At task 730, application server 510 selects a dialog sequence from set T that has the least human-monitoring requirement (e.g., the smallest numerical value, a requirement of false, etc.) After task 730, task 650 is completed and execution proceeds to task 655.

At task 740, application server 510 checks whether all the dialog sequences of set T have identical human-monitoring requirements. If not, execution proceeds to task 750; otherwise, execution continues at task 760.

At task 750, application server 510 selects a dialog sequence from set T that does not have the least human-monitoring requirement. As will be appreciated by those skilled in the art, in some embodiments any dialog sequence that does not have the least human-monitoring requirement might be selected, while some other embodiments might employ a heuristic for selecting a dialog sequence, perhaps based on the lengths of the dialog sequences, the estimated time until a service agent is available, etc. After task 750, task 650 is completed and execution proceeds to task 655.

At task 760, application server 510 selects any dialog sequence from set T. As in task 750, in some embodiments a dialog sequence might be selected arbitrarily, while some other embodiments might employ a heuristic for selecting a dialog sequence. After task 760, task 650 is completed and execution proceeds to task 655.

Figure 8:
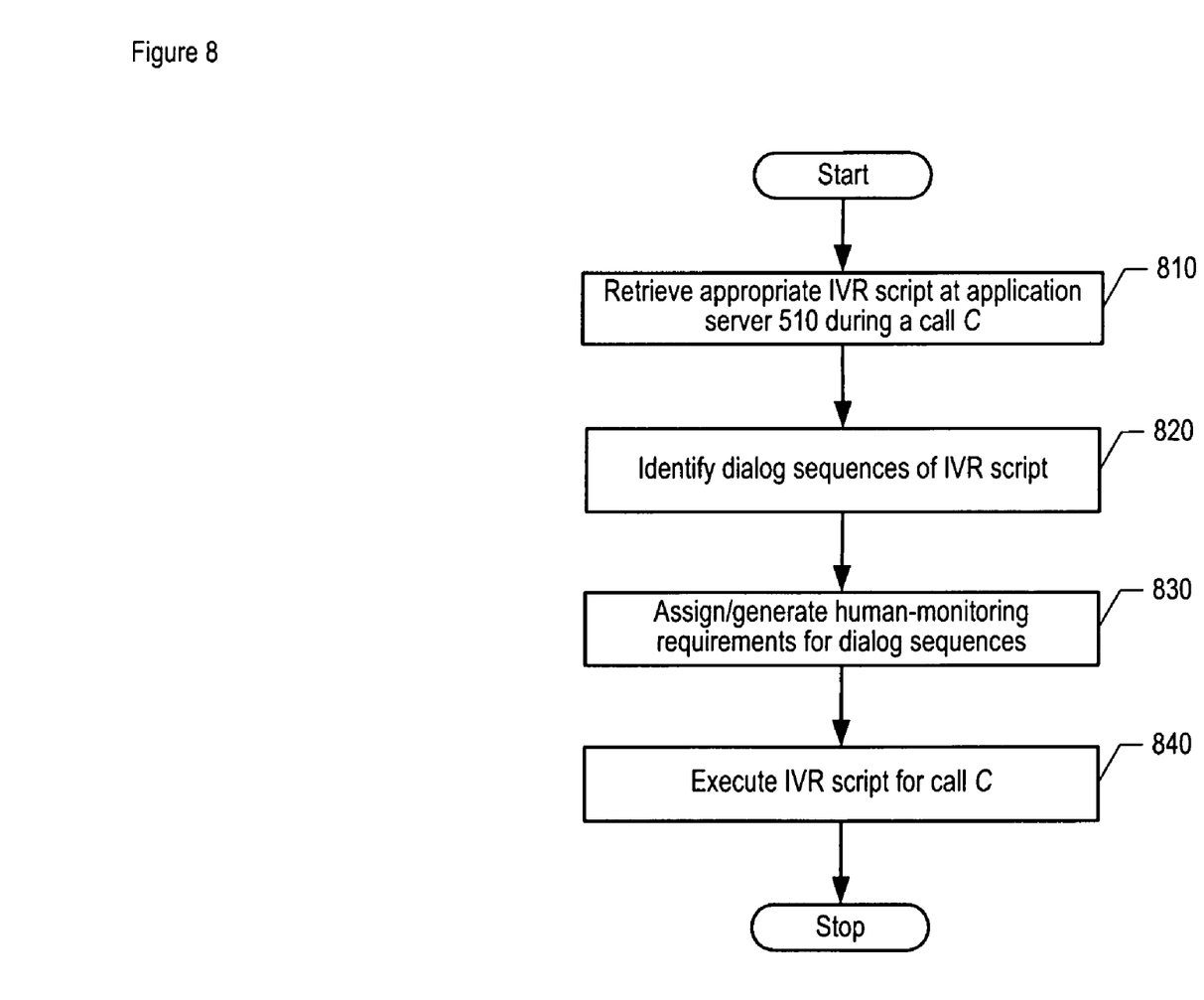
FIG. 8 depicts a flowchart of the salient tasks involved in processing an interactive voice response script, in accordance with the second illustrative embodiment of the present invention.

FIG. 8 depicts a flowchart of the salient tasks involved in processing an interactive voice response script, in accordance with the second illustrative embodiment of the present invention.

At task 810, application server 510 retrieves an appropriate IVR script during a call C, in well-known fashion.

At task 820, application server 510 identifies the dialog sequences of the IVR script. It will be clear to those skilled in the art how to parse a IVR script and identify its constituent dialog sequences.

At task 830, application server 510 assigns or generates human-monitoring requirements for the dialog sequences, as described above and with respect to task 640.

At task 840, interactive voice response (IVR) system 506 executes the IVR script for call C. Task 840 is described in detail below and with respect to FIG. 9.

Figure 9:
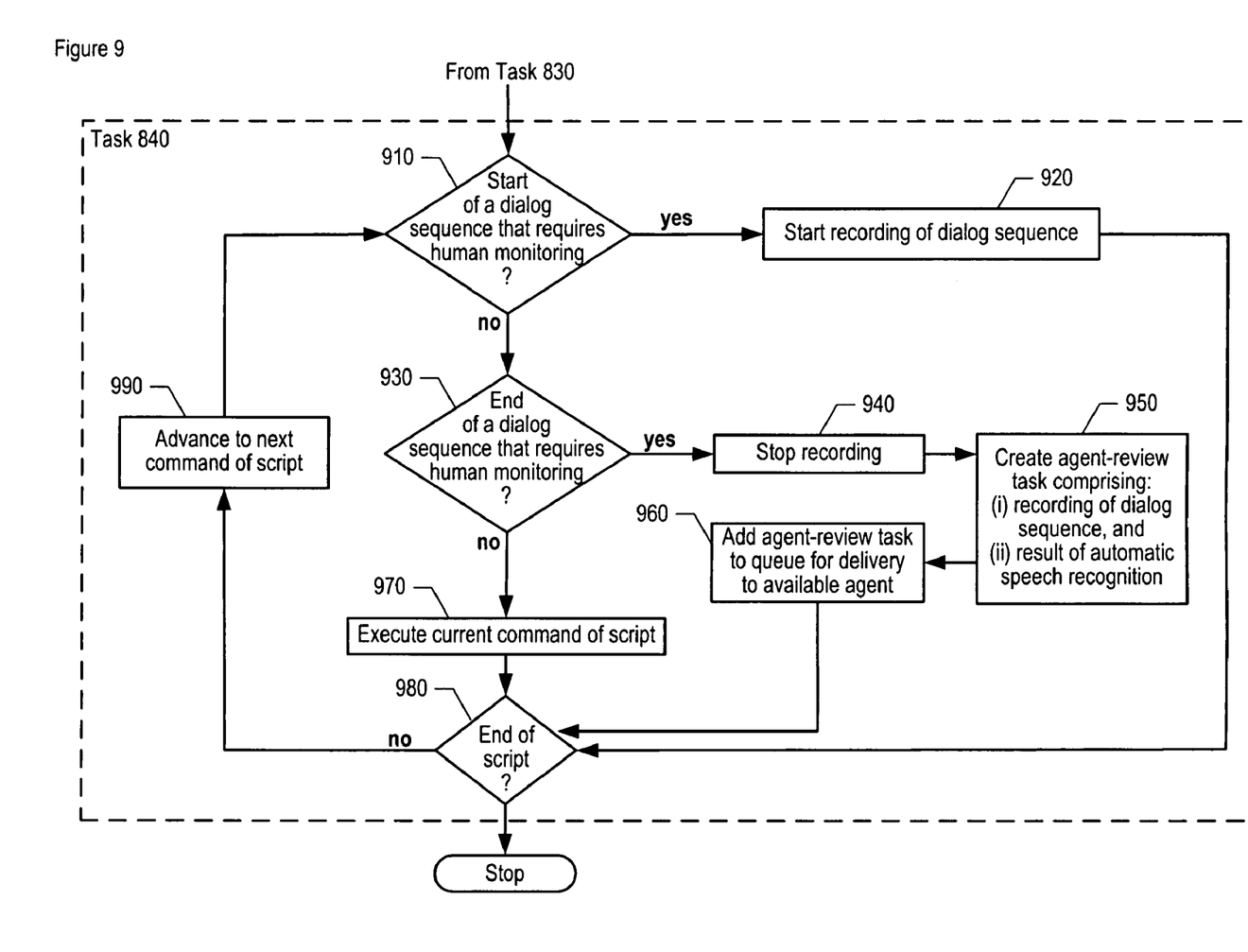
FIG. 9 depicts a detailed flowchart of task 840, as shown in FIG. 8, in accordance with the second illustrative embodiment of the present invention.

FIG. 9 depicts a detailed flowchart of task 840, in accordance with the second illustrative embodiment of the present invention.

At task 910, application server 510 checks whether the current position in the script (initially, the first line of the script) is the beginning of a dialog sequence that requires human monitoring. If so, execution proceeds to task 920; otherwise, execution continues at task 930.

At task 920, application server 510 sends a signal to interactive voice response (IVR) system 506 to start recording of the dialog sequence. After task 920, execution continues at task 980.

At task 930, application server 510 checks whether the current position in the script is the end of a dialog sequence that requires human monitoring. If so, execution proceeds to task 940; otherwise, execution continues at task 970.

At task 940, application server 510 sends a signal to interactive voice response (IVR) system 506 to stop recording of the dialog sequence.

At task 950, application server 510 creates an agent-review task comprising: (i) a recording of the just-completed dialog sequence, and (ii) the result of IVR system 506's automatic speech recognition for the just-completed dialog sequence.

At task 960, application server 510 adds the agent-review task to a queue for delivery to an available service agent. After task 960, execution continues at task 980.

At task 970, interactive voice response (IVR) system 506 executes the current command of the script, in well-known fashion.

At task 980, application server 510 checks whether the end of the script has been reached. If so, the method of FIG. 9 terminates; otherwise execution continues at task 990.

At task 990, application server 510 advances the current position in the script to the next command, and execution continues back at task 910.

Figure 10:
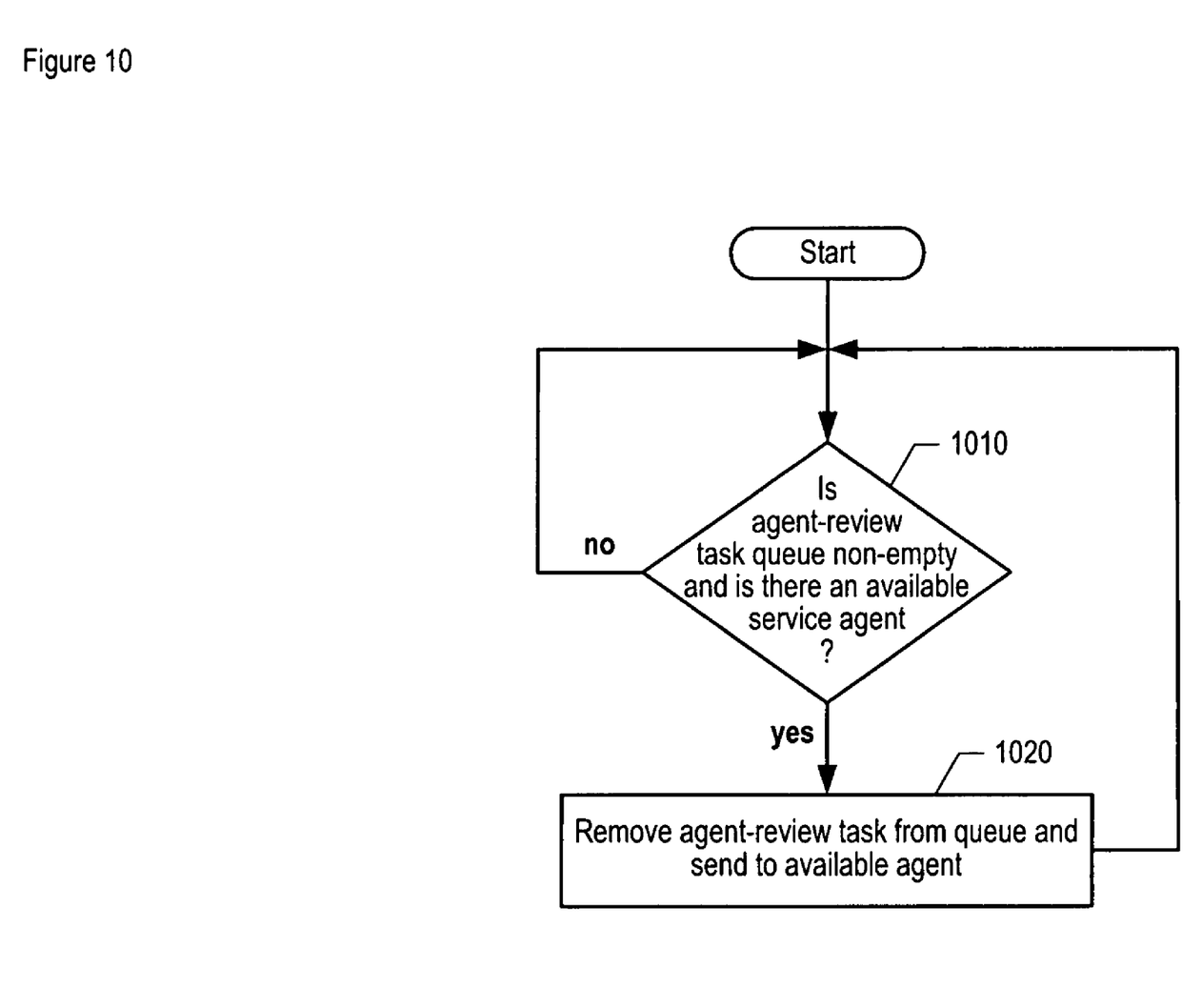
FIG. 10 depicts an event loop for the salient tasks involved in delivering agent-review tasks to service agents, in accordance with the second illustrative embodiment of the present invention.

FIG. 10 depicts an event loop for the salient tasks involved in delivering agent-review tasks to service agents, in accordance with the second illustrative embodiment of the present invention.

At task 1010, the event loop waits until both (i) the agent-review task queue is non-empty, and (ii) there are one or more available service agents.

At task 1020, an agent-review task is removed from the front of the queue and sent to an available service agent, in well-known fashion. After task 1020, execution continues back at task 1010.

Figure 11:
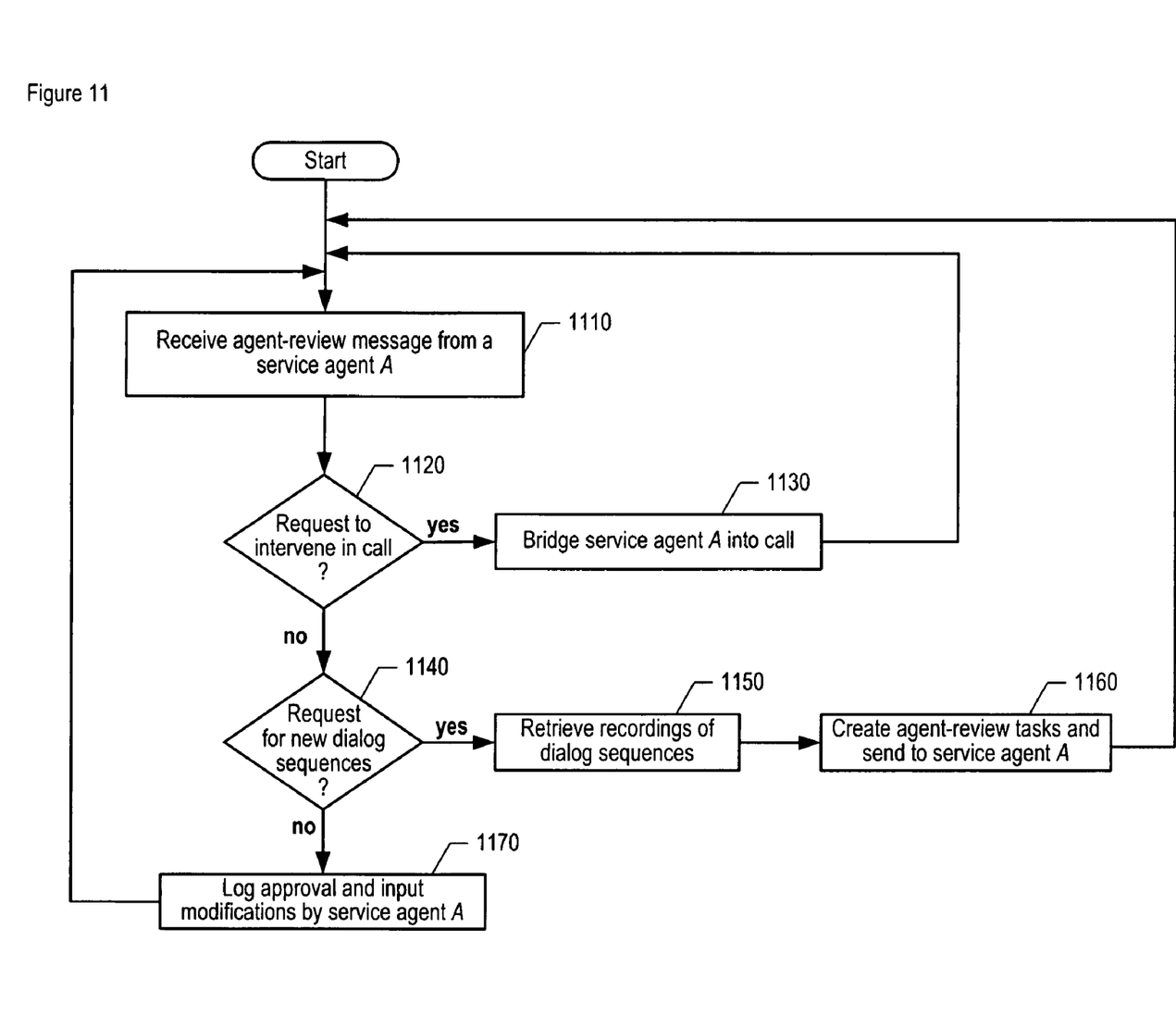
FIG. 11 depicts an event loop for the salient tasks involved in handling messages from service agents who process agent-review tasks, in accordance with the second illustrative embodiment of the present invention.

FIG. 11 depicts an event loop for the salient tasks involved in handling messages from service agents who process agent-review tasks, in accordance with the second illustrative embodiment of the present invention.

At task 1110, an agent-review message is received from a service agent A, in well-known fashion.

Task 1120 checks whether the message contains a request to intervene in the call. If so, execution continues at task 1130, otherwise execution proceeds to task 1140.

At task 1130, private branch exchange 505 bridges service agent A into the call, in well-known fashion. After task 1130, execution continues back at task 1110.

Task 1140 checks whether the message contains a request for one or more new dialog sequences from the call. If so, execution continues at task 1150, otherwise execution proceeds to task 1170.

At task 1150, interactive voice response (IVR) system 506 retrieves recordings of the requested dialog sequences, in well-known fashion.

At task 1160, agent-review tasks that correspond to the recordings are created and sent to service agent A. After task 1160, execution continues back at task 1110.

If task 1170 is reached, the message contains an approval by the service agent and, optionally, an indication of which caller inputs, if any, were modified by the service agent. The message is logged in well-known fashion, and execution continues back at task 1110.

As described above with respect to task 673, a combination of the first and second illustrative embodiments is possible in which a dialog sequence that requires human monitoring is monitored in real-time when a service agent is available, as in the first illustrative embodiment, and when no service agent is available, an agent-review task is created, as in the second illustrative embodiment.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale.

Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
    selecting a dialog sequence from a non-empty set S of dialog sequences, wherein each of said dialog sequences has a human-monitoring requirement; and
    executing said dialog sequence during a call that involves an interactive voice response system;
    wherein the selection of said dialog sequence is based on:
        (i) said human-monitoring requirements,
        (ii) the availability of one or more service agents, and
        (iii) a partial ordering on said set S; and
    wherein when none of said service agents is available, the selected dialog sequence:
        (i) is a member of set T={d ∈S |d has no predecessors}, and
        (ii) has the least human-monitoring requirement in set T.

2. The method of claim 1 further comprising generating said plurality of dialog sequences from a script for said interactive voice response system.

3. The method of claim 1 wherein when none of said service agents is available, the selected dialog sequence has the least human-monitoring requirement.

4. The method of claim 1 wherein when one or more of said service agents is available and when two or more of said human-monitoring requirements are different, the selected dialog sequence does not have the least human-monitoring requirement.

5. The method of claim 1 further comprising:
    bridging one of said service agents into said call during the execution of said dialog sequence when said dialog sequence requires human monitoring; and
    dropping said one of said service agents from said call after said dialog sequence has completed.

6. The method of claim 1 further comprising, when said dialog sequence requires human monitoring, generating an agent-review task that comprises one or both of:
    (i) a recording of said call during said dialog sequence, and
    (ii) an output of automated speech recognition.

7. The method of claim 6 further comprising transmitting a signal based on said agent-review task to an available one of said service agents.

8. A method comprising:
    selecting a dialog sequence from a non-empty set S of dialog sequences, wherein each of said dialog sequences has a human-monitoring requirement; and
    executing said dialog sequence during a call that involves an interactive voice response system;
    wherein the selection of said dialog sequence is based on:
        (i) said human-monitoring requirements,
        (ii) the availability of one or more service agents, and
        (iii) a partial ordering on said set S; and
    wherein when one or more of said service agents is available, the selected dialog sequence:
        (i) is a member of set T={d∈S|d has no predecessors}, and
        (ii) does not have the least human-monitoring requirement in set T when set T has two or more dialog sequences with different human-monitoring requirements.

9. The method of claim 8 further comprising generating said plurality of dialog sequences from a script for said interactive voice response system.

10. The method of claim 8 wherein when none of said service agents is available, the selected dialog sequence has the least human-monitoring requirement.

11. The method of claim 8 wherein when one or more of said service agents is available and when two or more of said human-monitoring requirements are different, the selected dialog sequence does not have the least human-monitoring requirement.

12. The method of claim 8 further comprising:
    bridging one of said service agents into said call during the execution of said dialog sequence when said dialog sequence requires human monitoring; and
    dropping said one of said service agents from said call after said dialog sequence has completed.

13. The method of claim 8 further comprising, when said dialog sequence requires human monitoring, generating an agent-review task that comprises one or both of:
    (i) a recording of said call during said dialog sequence, and
    (ii) an output of automated speech recognition.

14. The method of claim 13 further comprising transmitting a signal based on said agent-review task to an available one of said service agents.

* * * * *